(12) United States Patent
McCluskey et al.

(10) Patent No.: US 9,156,714 B2
(45) Date of Patent: Oct. 13, 2015

(54) ENERGY GENERATION SYSTEM AND RELATED USES THEREOF

(71) Applicant: CONCURRENT TECHNOLOGIES CORPORATION (CTC), Johnstown, PA (US)

(72) Inventors: Michel J. McCluskey, Somerset, PA (US); Mark Becker, Johnstown, PA (US); Michael Pollock, Boswell, PA (US); Daniel R. Markiewicz, Johnstown, PA (US)

(73) Assignee: Concurrent Technologies Corporation, Johnstown, PA (US)

(*) Notice: Subject to any disclaimer, the term of this patent is extended or adjusted under 35 U.S.C. 154(b) by 0 days.

(21) Appl. No.: 14/616,419

(22) Filed: Feb. 6, 2015

(65) Prior Publication Data

US 2015/0151983 A1    Jun. 4, 2015

Related U.S. Application Data

(62) Division of application No. 13/841,760, filed on Mar. 15, 2013, now Pat. No. 8,968,948.

(60) Provisional application No. 61/650,190, filed on May 22, 2012.

(51) Int. Cl.
*C02F 1/44* (2006.01)
*H01M 8/06* (2006.01)
(Continued)

(52) U.S. Cl.
CPC .............. *C02F 1/441* (2013.01); *B01D 61/025* (2013.01); *B01D 61/06* (2013.01); *B01D 61/12* (2013.01); *C02F 1/00* (2013.01); *H01M 6/32* (2013.01); *H01M 8/065* (2013.01); *H01M 8/0656* (2013.01); *H01M 16/00* (2013.01); *H01M 16/003* (2013.01); *H01M 16/006* (2013.01); *B01D 2311/04* (2013.01); *B01D 2313/365* (2013.01); *C02F 1/32* (2013.01);
(Continued)

(58) Field of Classification Search
None
See application file for complete search history.

(56) References Cited

U.S. PATENT DOCUMENTS 4,025,697 A    5/1977   Hart
4,752,363 A  * 6/1988   Buckley et al. ............... 205/693
(Continued)

FOREIGN PATENT DOCUMENTS

WO    WO 89/11165 A1    11/1989

OTHER PUBLICATIONS

International Search Report and Written Opinion issued Dec. 19, 2013 in PCT/US2013/042208.

*Primary Examiner* — Gregg Cantelmo
(74) *Attorney, Agent, or Firm* — Oblon, McClelland, Maier & Neustadt, L.L.P.

(57) ABSTRACT

A self contained energy generating system that comprises a galvanic battery and a power distribution system. The energy generating system is used to purify water by using a reverse osmosis device that draws in a source of water and transfers electrolytes to the galvanic battery. Upon contact with the electrolyte, the galvanic battery produces energy by an oxidation-reduction reaction of the cathode and anode and transfers energy to the power distribution system, which in turn provides power to the osmosis device. Additionally, the system includes a hydrogen fuel cell to increase the amount of energy generated and a power storage device for storing excess energy generated. The system also includes a controller which is configured to regulate the overall operation of the system.

1 Claim, 8 Drawing Sheets (51) Int. Cl.
*H01M 16/00* (2006.01)
*C02F 1/00* (2006.01)
*H01M 6/32* (2006.01)
*B01D 61/02* (2006.01)
*B01D 61/06* (2006.01)
*B01D 61/12* (2006.01)
*C02F 1/32* (2006.01)
*H01M 8/10* (2006.01)

(52) U.S. Cl.
CPC ...... *C02F 2201/009* (2013.01); *C02F 2303/04* (2013.01); *C02F 2303/10* (2013.01); *H01M 2008/1095* (2013.01); *Y02E 60/50* (2013.01); *Y02W 10/30* (2013.01)

(56) References Cited

U.S. PATENT DOCUMENTS

| | | | |
|---|---|---|---|
| 4,836,929 A * | 6/1989 | Baumann et al. | 210/638 |
| 6,100,600 A * | 8/2000 | Pflanz | 290/54 |
| 2002/0017463 A1* | 2/2002 | Merida-Donis | 204/551 |
| 2002/0090868 A1* | 7/2002 | Schmitman | 440/113 |
| 2003/0132097 A1* | 7/2003 | Kenet et al. | 203/11 |
| 2003/0138675 A1 | 7/2003 | Cibuzar | |
| 2005/0183964 A1 | 8/2005 | Roberts et al. | |
| 2008/0230376 A1 | 9/2008 | Brauns | |
| 2009/0324997 A1 | 12/2009 | Tsuji | |
| 2011/0011802 A1 | 1/2011 | Maydan | |
| 2012/0111800 A1 | 5/2012 | Collins | |
| 2014/0193731 A1 | 7/2014 | Becker et al. | |

* cited by examiner

ENERGY GENERATION SYSTEM AND RELATED USES THEREOF

CROSS-REFERENCE TO RELATED APPLICATIONS

This application is a divisional application of, and claims the benefit of priority under 35 U.S.C. §120 from, U.S. application Ser. No. 13/841,760, filed Mar. 15, 2013, now U.S. Pat. No. 8,968,948, issued on Mar. 3, 2015, herein incorporated by reference, which claims the benefit of priority from Provisional Patent Application Ser. No. 61/650,190, filed on May 22, 2012, the entire contents of which are herein incorporated by reference.

FIELD

The present invention relates to energy generating systems, methods of use and applications thereof. More particularly, embodiments of the present invention relate to energy generation systems having one or more galvanic batteries configured for use with an electrolytic solution for producing energy.

BACKGROUND

Energy is a critical component of modern society and is typically considered a necessity for health, hygiene, communication and as such is required for most devices and applications. In most environments, energy is generally readily available for use as required. However, there are many instances in which the required energy is not readily available, such as in remote geographic areas, austere environments, impoverished regions, disaster areas, and so on. These areas are typically referred to as "off the grid" regions and require access to alternate means to satisfy their energy requirements, such as batteries, generators, and the like. Unfortunately, each of these sources has its inherent disadvantages. For example, batteries are heavy and have limited operational life. Generators require fossil fuel and have significant thermal and acoustic signatures. Further, they are expensive and also have a significant logistics impact. Renewable energy (e.g., solar) often cannot provide continuous, uninterrupted energy. As such, an energy generating device capable of operating without batteries, generators and/or renewable energy would be beneficial, especially in remote environments where it is difficult and/or impracticable to transport the consumable items needed for energy generation.

Similar to the above-mentioned situations in which access to energy may be limited, access to purified, potable water, in situ, continues to face similar challenges in remote locations. For example, current conditions at military bases require the transport of large amounts of water for both drinking and other uses. Currently, drinking water is frequently provided as bottled water and water for other uses, such as laundry and cleaning, is transported to the military base via convoys. This approach of providing water to military personnel not only proves to be cost-inefficient but is also considerably risky, as it requires the use of personnel for transport, thereby taking those individuals away from the mission. Further, a gallon of water is approximately 8 pounds in weight and depending on the size of the team operating in the remote environment (and the expected duration of the mission), the total amount of water required can be of a substantial weight. In a military application where the team often reaches its site by foot, any additional weight can be a highly problematic strain.

Accordingly, it would be beneficial to have a water purification device that is configured to purify water without the need for a generator, fossil fuels or other cumbersome technologies.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DETAILED DESCRIPTION

Embodiments disclosed herein relate to an apparatus and method for energy generating system that is configured to generate energy without the use of fossil fuels, generators, external batteries or the like. The energy generation system will be described in context of a water purification system, wherein the energy generating system provides the required amount of energy to perform the water purification process.

According to one embodiment of the invention, an energy generating system comprises one or more galvanic cells using an electrolytic solution for generating energy. As will be more fully described herein, the energy generating system of the present embodiment of the invention overcomes the disadvantages associated with conventional energy generation technology, by requiring only an electrolyte to drive energy generation. In contrast, conventional technologies usually require fossil fuels, or similar to drive energy generation. By eliminating the need for these sources, a compact and easily transportable energy generation system is realizable in remote environments otherwise ill-suited to the logistics demands conventional systems impose.

The energy generation system will now be discussed in the context of a water purification system, wherein the energy generation system provides the required amount of energy for successfully implementing the water purification operation. However, it is to be appreciated that this discussion is intended to facilitate a more thorough understanding and illustration of the energy generation system, and should not be read as to circumscribe its applicability. To the contrary, there are many contemplated applications for the energy generation system, not all of which include water purification. Additional and alternative applications and embodiments will be more fully described herein.

In an example application, the galvanic battery of the present embodiment of the invention can be adapted for use in connection with a water purification system. Water purification systems, especially those employing reverse osmosis (RO) units, require an energy source to drive the RO-based water purification. For example, a small mobile RO unit requires a 5 kW generator to function, thereby producing a significant level of noise and heat signature and also requires constant maintenance. In the present embodiment of the invention, the galvanic battery can provide the energy necessary to power the water purifier system, thus providing an advantage over conventional approaches requiring fossil fuel and/or renewable energy sources. Further, a RO unit outputs purified water and a waste stream (electrolytes). If the input to the RO unit is an electrolytic solution, such as seawater, the waste stream will also be electrolytic, such as a brine solution. Normally this waste stream is discarded as waste. However, the galvanic battery of the present embodiment is configured to translate this waste into energy, which in turn can be directed back to the RO unit for continued operation. Additionally, depending on the configuration of the system, the galvanic battery may produce more energy than is required to drive the RO unit, this excess energy can be stored and/or exported for use by external devices. Thus, in an example application, the present embodiment provides a self-contained system able to purify water, automatically generate the energy necessary for the water purification, and additionally generate excess energy that can be used to power external devices, all without necessarily relying on generators, fossil fuels and/or renewable energy sources.

Figure 1:
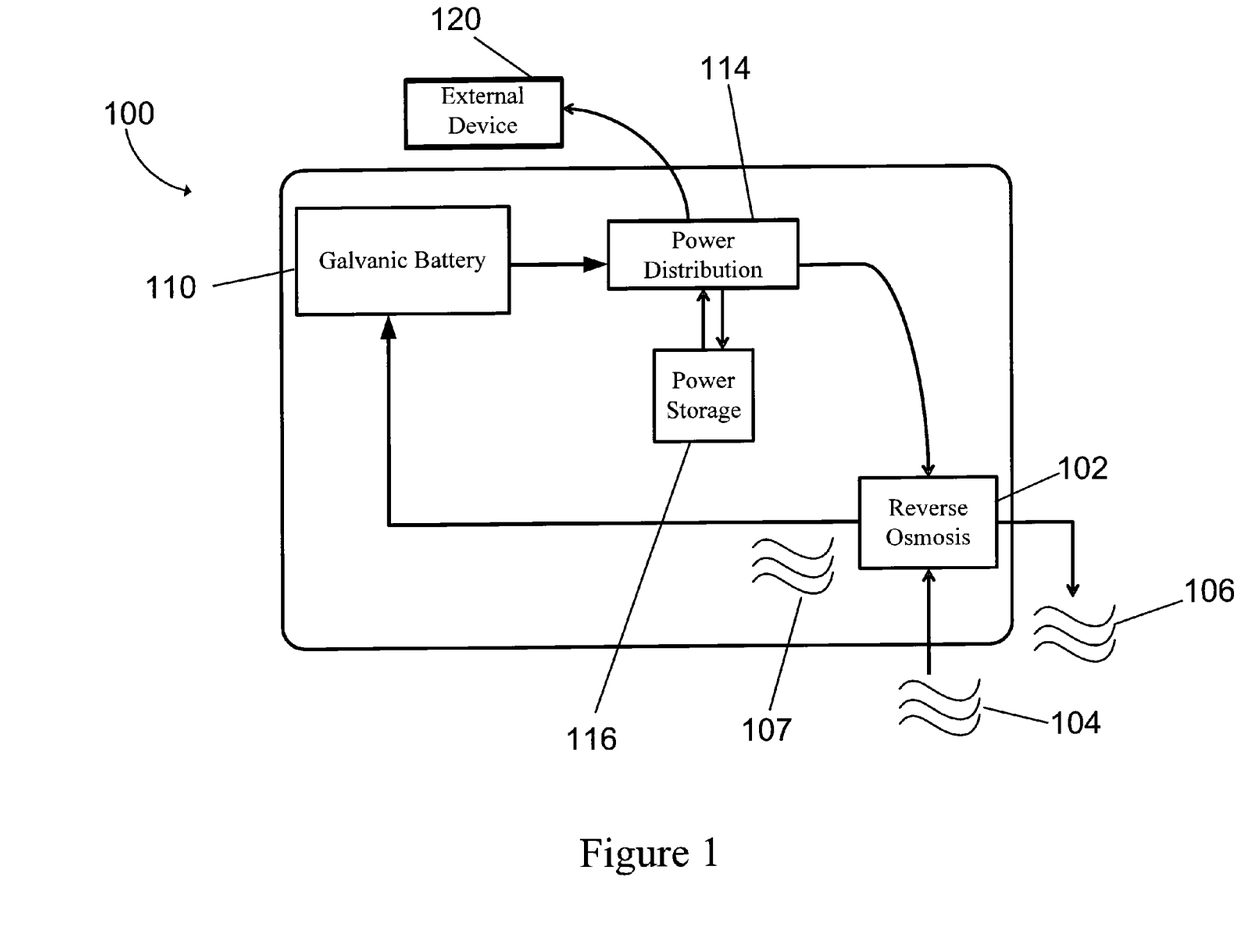
FIG. 1 is a schematic representation of a water purification system incorporating an electrolytically-driven galvanic battery according to one embodiment of the invention.

Turning to FIG. 1, illustrated is a schematic representation of a water purification system 100 employing the galvanic battery energy source according to an embodiment of the invention. The system 100 preferably includes a reverse osmosis (RO) unit 102, a galvanic battery 110, and a power distribution system 114. In operation, the RO unit 102 draws in a water source 104, such as brackish water, seawater or the like and produces purified water 106, and passes the waste stream 107, to the galvanic battery 110. Upon contact with the waste stream (i.e., an electrolyte), the galvanic battery 110 produces energy and transfers it to the power distribution system 114, which makes the energy available to the RO unit 102 for continued operation. A discussion of each of the example elements of FIG. 1 will follow.

The RO unit 102 can be any device capable of purifying water, including forward osmosis, charcoal, simple filtration and the like. The RO unit is a membrane technology-based filtration method that removes particles and other elements from solutions by applying pressure to the solution when it is on one side of a selective membrane. The RO unit can be variously combined with other technologies as applications dictate, such as one or more sediment filters (optionally with varying pores sizes), activated carbon filters, ultra-violet (UV) lamps for disinfecting any microbes, sea water-specific elements, and so on. It is to be understood that any solution exhibiting electrolytic properties can be used in connection with the present embodiment of the invention. For example, suitable solutions include salt water, brine, runoff, mineral water, urine, any Chloride (XX-CL), and so on.

Turning now to the galvanic battery 110, the battery 110 is any device capable of generating a galvanic reaction in the presence of an electrolyte. A galvanic battery, also known as a galvanic cell or voltaic cell, is an electrochemical cell that derives electrical energy from a reduction-oxidation (redox) reaction occurring between different metals in the presence of an electrolyte. Metals for such galvanic batteries are often selected with reference to a galvanic series table, i.e., the potential they develop in an electrolyte, along with application parameters.

The coupling of a galvanic battery with a RO unit provides certain advantages. For example, in an RO operation using a chloride-containing water as a source, brine reject is produced as a byproduct of the water purification operation. This reject is often discarded on creation. However, when the RO unit is coupled to a galvanic battery, as described above, the brine reject is an essentially free electrolyte able to drive the galvanic battery 110 and produce energy.

In a preferred embodiment, the galvanic battery 110 is a magnesium-carbon (MagC) battery. Further to the energy production aims, the significant galvanic difference between magnesium and carbon provide for high energy density, particularly relative to conventional batteries. More specifically, a conventionally high energy density battery, such as a lithium polymer battery, has an energy density of approximately 400 watt-hours/Kg. In contrast, a MagC battery displays an energy density of approximately 1600 watt-hours/Kg, which represents a 4× energy increase at approximately a one-quarter of the mass of a comparable lithium polymer battery. In applications where weight is a concern, such as expeditionary applications (e.g., military operations), the MagC battery provides significant weight advantages without a corresponding energy tradeoff.

MagC batteries may be used in marine environments due to the abundance of seawater electrolyte that provides the approximately 2% salinity MagC batteries require for operation. However, as will be shown below, the galvanic battery 110 can be used in any environment with certain modifications that provide for the ready supply of a sufficient electrolyte. The presence of an electrolyte causes the magnesium (or any other suitable metal/anode) to galvanically corrode, and thereby produce energy that is captured by the power distribution system 114 (to be discussed). Further, MagC operation also produces magnesium hydroxide ($Mg(OH)_2$) as a byproduct. Magnesium hydroxide (also known as milk of magnesia) is a generally inert compound ideally flushed (actively or passively) from the battery, and various modifications may be made to facilitate the steady removal of magnesium hydroxide from between the selected anode and cathode so as to minimize disruption to electrical generation. The magnesium hydroxide may suitably be discarded or retained for alternate applications. In what follows, there is first described a configuration of the MagC battery and then described the power distribution system of the present embodiment of the energy generating system.

Figure 2A:
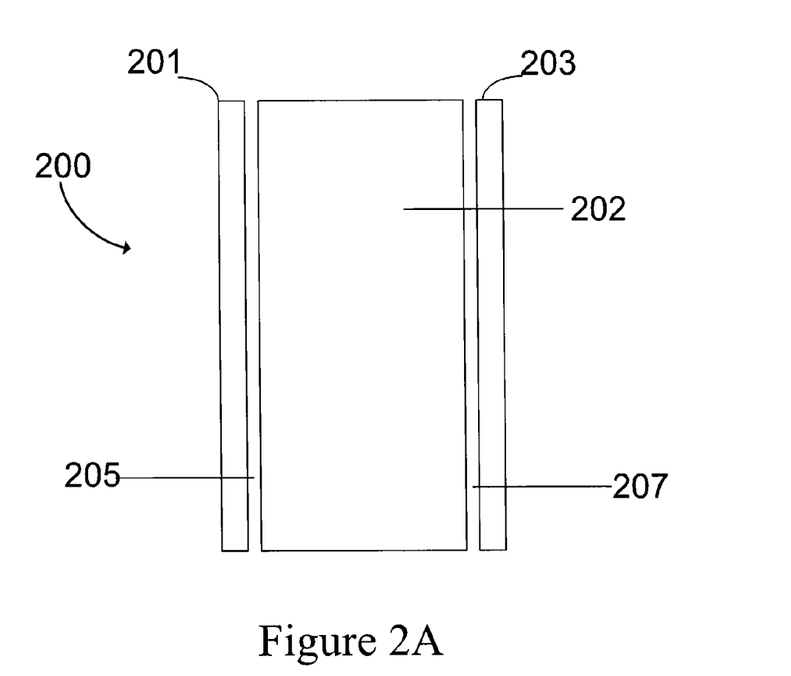
FIG. 2A depicts a configuration of a double-sided MagC battery and FIG. 2B represents a stack of MagC batteries.

FIG. 2A depicts the configuration of a double sided MagC battery 200. The MagC battery is predicated upon a galvanic reaction (or difference in potential electric charge) between two dissimilar materials. Referencing the galvanic series, the two most dissimilar materials are magnesium and carbon. Magnesium (the anode of the battery) 202, corrodes when placed in an electrolyte solution with a cathode material, such as carbon (cathodes 201 and 203). During the corrosion (oxidation reaction), electrons are free to move from the cathode to the anode. Further, if connected together in a circuit, energy can be extracted from the corrosion of the anode in the form of direct current electricity. Specifically, the chemical reaction governing the operation of a MagC battery can be represented as:

$$Mg+2H_2O \rightarrow Mg(OH)_2+H_2 \qquad (1)$$

While magnesium, in general, is considered as the anode material of the MagC battery, different alloys of magnesium could be used as anodes. For example, the magnesium alloy AT61 offers a performance of 30 milli-amperes (mA) per cm$^2$ of current density. Further, while AT61 is the magnesium alloy is used in the example, alloys such as AZ31B, AZ 61 and AZ91D can also be used. The cathode material of the MagC battery is a carbon based cathode, referred to as carbon based air cathode 201 and 203. The air cathode can further be catalyzed with other elements that support the magnesium/carbon reaction of (1).

In order to generate the optimum amount of power, the cell design as represented in FIG. 2A, is double sided (i.e., including a single anode in the center of the cell and 2 air cathodes on both sides). This design allows the cell to generate electricity from both sides of the anode and provides higher current than a corresponding single sided design which includes a single cathode and a single anode arrangement. Further, the double-sided design of the MagC battery also aids in the flow of the electrolyte around the cell to remove the magnesium hydroxide byproduct. However, a single sided design may also be used.

Figure 2B:
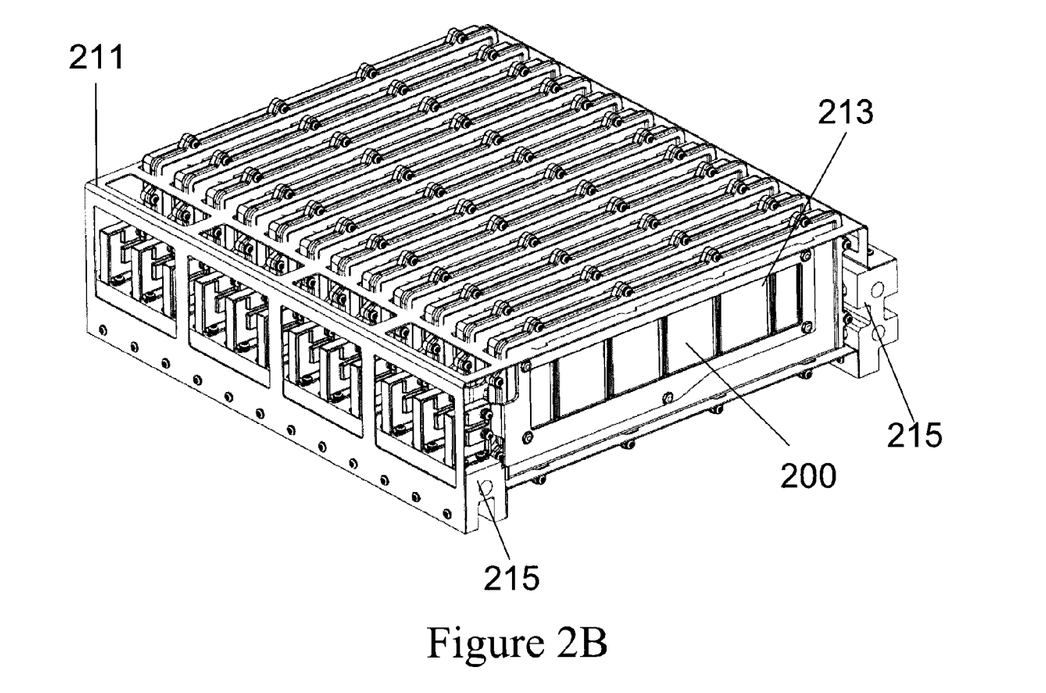

FIG. 2B represents a stack of MagC batteries that can be used as the galvanic battery 110 in the embodiment of FIG. 1. A frame 211 (made of acrylonitrile butadiene styrene (ABS)) and a cathode support 213 (of acrylic plastic) provide the required support to each of the MagC battery. Further, a pair of base plates 215 are provided to maintain the stack of MagC batteries in position. Alternatively, a single base plate can be used to support the support the stack of MagC batteries. The frame design as depicted in FIG. 2B allows for the anode to be easily removed and replaced for refueling purposes. The number of cells in a particular stack are dependant on the design parameters of the energy generating system. For example, a stack with 24 MagC batteries wired in series, provides a 1.2 VDC and approximately 25 A current per battery. This corresponds to approximately 4.2 kWh of stored energy in the anode of each battery.

Specifically, the magnesium component of the MagC battery is a consumable item due to its gradual corrosion, and each cell is able to produce a generally fixed amount of energy based on the overall size and other relevant parameters of the actual cell. As a given cell cannot produce energy indefinitely, the limited life has implications to the overall system 100 design with particular regard to the amount of energy required by users of the system 100. As previously mentioned, one application of the water purification system 100 is to support expeditionary activity, such as a team of soldiers executing a mission autonomously in an austere environment. The parameters of these missions are often predetermined, such as the overall mission duration (e.g., 10 days) and the number of soldiers constituting the team. Once the parameters are understood (e.g., the number of soldiers, the mission duration, how much water per day per solider is required, and the amount of energy required to produce a unit of water, etc.), the system 100 can be appropriately constructed to contain any number of MagC batteries necessary to produce the required quantity of energy.

Further, the limited life of a galvanic battery also impacts overall system 100 lifecycle considerations. For example, there may be applications in which single system 100 use (e.g., use until the system 100 is no longer able to generate electricity) is acceptable, with the system 100 being disposed off on expiration. The system 100 can also be configured to have modular galvanic batteries 110, in a "plug and play" like manner, removable from the system 100 (as shown in FIG. 2B) on expiration and replaceable with fresh batteries 110. In one approach, the system 100 is configured conceptually similar to an ink-jet printer such that an average user (i.e., not necessarily a maintenance operator) can easily remove and replace the consumable item with ease.

Turning now to the power distribution system 114 of FIG. 1, the power distribution system 114 is provided as any means, such as a common bus, able to connect to an energy source and transmit power to select components. In connection with the water purification system 100, the power distribution system 114 connects the galvanic battery 110 with the RO unit 102, permitting the transmission of energy therebetween.

The system 100 may include one or more power storage devices 116 connected to the power distribution system 114 or to another suitable system 100 element. The power storage device 116, such as a conventional battery (e.g., lead acid, lithium ion, lithium polymer, etc.) may be used to store energy generated by the MagC battery 110. The power storage device 116 may store excess energy, i.e., quantities of energy present in the system 100 beyond that required to power the RO unit 102. Further, the storage device 116 is able to make energy stored therein available to the system 100 as required, or to an external device 120, such as laptops, external battery pack, communication equipment or the like.

According to another embodiment of the present disclosure, the energy generating system may comprise a proton exchange membrane (PEM) hydrogen fuel cell. As is described previously, the oxidation reaction while employing a MagC battery results in hydrogen gas as a by-product. Accordingly, this hydrogen gas may be utilized in an additional fuel cell to generate more energy.

Figure 3:
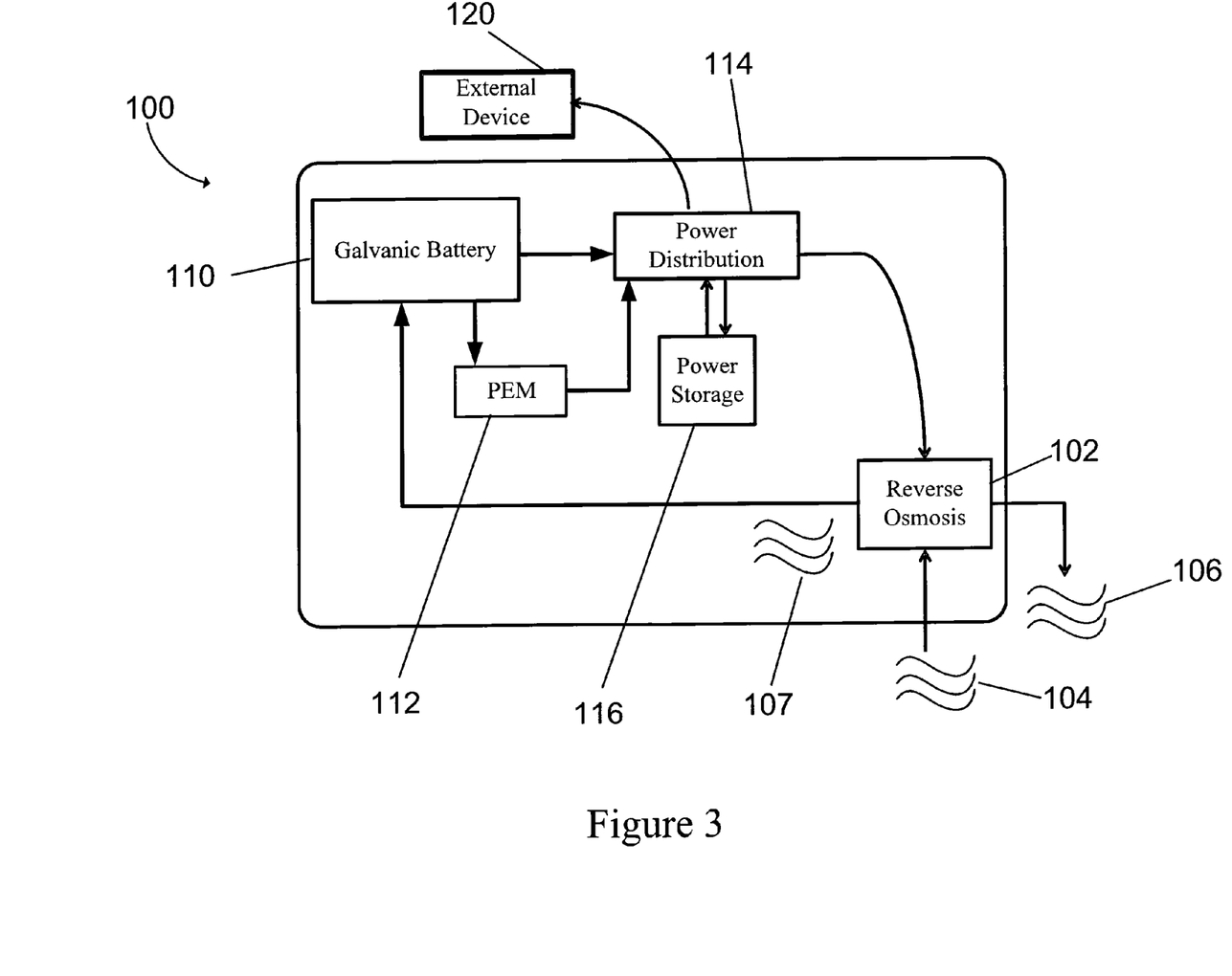
FIG. 3 is a schematic representation of a water purification system according to another embodiment of the disclosure incorporating a hydrogen fuel cell coupled with the galvanic battery.

Specifically, as shown in FIG. 3, the galvanic battery 110 may be associated with one or more other fuel cells to increase the level of energy produced. In connection with the example of the battery 110 provided as a MagC battery, the additional fuel cell(s) may suitably include one or more proton exchange membrane (PEM) fuel cells 112. PEM fuel cells are able to generate electrical energy from hydrogen gas, which is one of the by-products of the MagC oxidation reaction. Any suitable means can be employed for capturing the hydrogen gas output from the battery 110 and introducing the hydrogen gas into the PEM fuel cell, such as various approaches to humidity adjustment, etc. Further, the PEM cell can include a hydrogen regulation system that comprises valves and ensures that the captured hydrogen does not seep back into the MagC battery. Accordingly, coupling a PEM fuel cell with the MagC battery provides a use for an otherwise discarded product ($H_2$), and also increases system efficiency by generating additional energy. Further, the PEM cell can include a combustion burner (such as a standard orifice type burner), suitable for burning the collected hydrogen to produce heat energy. It is to be appreciated that any two different types of fuel cells or batteries can be used together, where an output of one cell is able to be used by the second fuel cell for energy generation.

Other approaches can be taken to recycle the generated hydrogen gas. For example, the hydrogen gas can be exported to various external devices able to use hydrogen gas as fuel, such as a burner, cooking device, heater, and the like.

Figure 4:
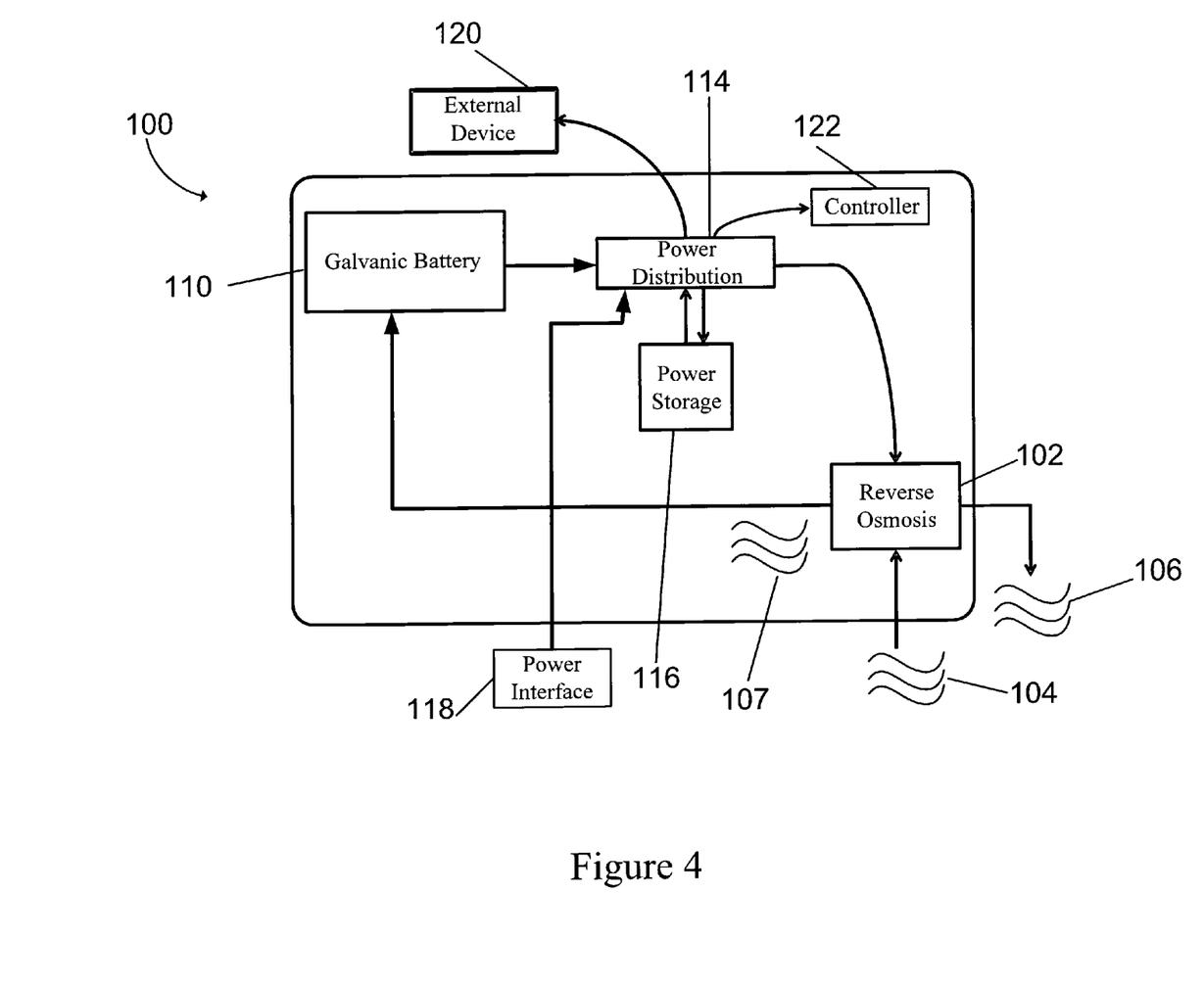
FIG. 4 is a schematic representation of a water purification system according to another embodiment of the disclosure incorporating a controller and an external power source.

According to another embodiment of the present disclosure, the energy generating system may comprise a controller 122 and an external power interface as shown in FIG. 4. The system includes a controller 122 for controlling and/or regulating operation of the device. Such a controller may include a programmable logic controller (PLC) or other microprocessor capable of being programmed to ensure system 100 operation according to a predetermined number of parameters. Also utilized by the controller may be computer readable media such as memories or other logic circuitry. For example, the controller may dictate that, at system startup, waste (i.e., electrolyte) flows from the RO unit 102 at a relatively higher rate so as to minimize galvanic battery 110 downtime immediately following system 100 startup. The controller may further dictate that once the galvanic battery 110 is sufficiently immersed within the electrolyte, the waste flow is reduced to a relatively lower, steady rate. Additionally, the controller may provide for a galvanic battery 110 drain sequence to remove electrolyte from the battery 110 upon certain predetermined states being achieved. These adjustments to flow rates may be mediated by various valves or similar mechanisms. Further, the controller may be configured to control a pump which circulates the generated electrolytes within the galvanic battery.

The controller 122 may also be configured to monitor and record system 100 performance. For example, certain levels of activity may be pre-determined as optimal for each system 100 element, such as the RO unit 102 producing a certain volume of reject. The controller 122 may also be configured to monitor such performance and adjust the system 100 as necessary (e.g., opening/closing various valves, stopping RO unit 102 operation, and the like). Further, the controller 122 may monitor and store system 100 performance, such as the amount of energy produced, runtime, the amount of water purified, the amount of energy exported from the system 100, and so on. Further, the controller 122 may include various hardware elements for computing and visually displaying system 100 relevant information, such as an amount of life left in the galvanic battery 110, a level of energy stored in the system 100, and so on. The controller 122 may determine battery 110 life through any suitable means, such as measuring the battery's 110 voltage, through appropriate algorithms that forecast battery life, and the like. The controller's visual display may be provided as any suitable device capable of providing visually-observable information, such as an indicator light, a gauge, an electronic screen, and the like.

The feature of indicating system 100 remaining life offers certain benefits. Returning to the expeditionary mission example, the remaining life information may inform the mission team whether they are over or under-utilizing the system 100, and thereby enable the team to adjust their usage accordingly. Further, the expeditionary mission team may determine, for various reasons, that its originally planned, e.g., 10 day mission, now needs to be extended to, e.g., 20 days. As such, the team can use remaining life information to ration their use of the system 100 to support the extended duration. In another example, if the expeditionary team returns to its home base after completing the mission and the system 100 indicates the there is life remaining, the system can be used a second time by a team having a mission corresponding to the remaining life.

Further, the power storage unit 116 may optionally be pre-charged and may contain energy stored for the first use of the system 100. As stated previously, the RO unit 102 and the galvanic battery 110 operate in a loop where RO-generated waste provides the electrolyte required by the galvanic battery 110 to generate energy. In the system's 100 first usage, the battery 110 may not have been able to generate the energy required to drive the RO unit 102. Accordingly, the power storage device 116, if pre-charged, can provide the priming energy necessary to operate the RO unit 102, which in turn enables the galvanic battery 110 to begin powering the RO unit 102 itself.

The system 100 may include an external power interface 118, such as a conventional plug. Such an interface 118 may provide a number of functional benefits. For example, the interface 118 may enable the system 100 to connect to an external energy source (e.g., generator, conventional battery, vehicle battery, conventional energy source, etc.) for drawing additional energy into the system 100. Such additional energy may be beneficial in the event the system 100 does not have a sufficient initial charge, the galvanic battery 110 is inoperable, or as other conditions dictate.

The external power interface 118 also provides a means for exporting energy to a device external to the system 100. As previously mentioned, the system 100 is preferably able to generate more energy than the RO unit 102 requires and store the excess energy. This energy can be exported to external devices that have a requirement for energy, such as rechargeable batteries, various electronic devices (e.g., computers) and the like. The interface 118 may also include an integrated DC to AC inverter.

Figure 5:
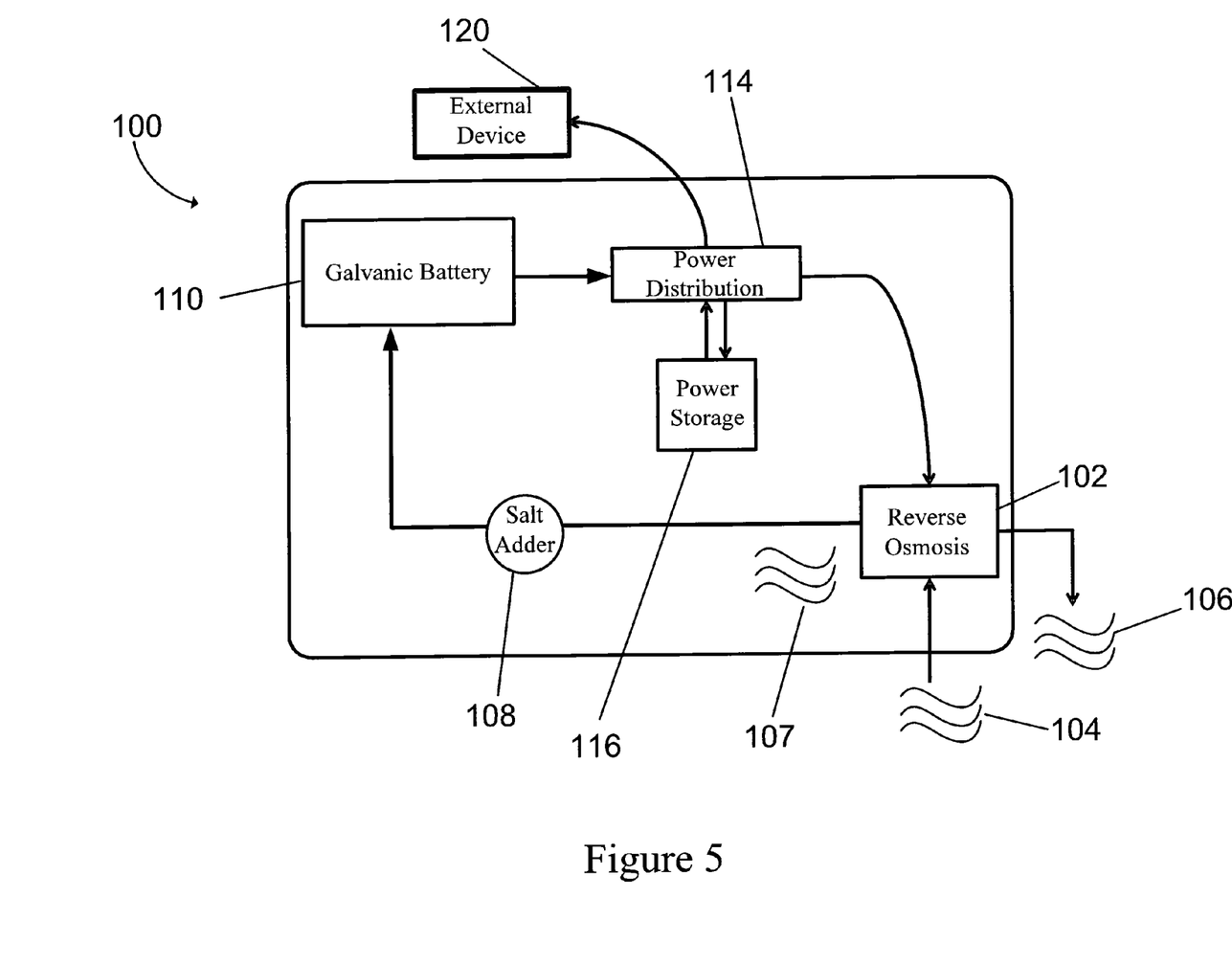
FIG. 5 is a schematic representation of a water purification system according to another embodiment of the disclosure incorporating a saline input unit.

FIG. 5 depicts another embodiment of the present disclosure wherein the system 100 includes a mechanism for adding salt (or similar compound), to the electrolyte 107 provided the by RO unit 102. As previously stated, the galvanic battery 110 requires an electrolyte to operate. In the water purification system 100, the electrolyte is provided by the RO unit 102. However, there are circumstances in which additional salt may be required. For example, if the system 100 is deployed in a purely fresh water environment, the salt adder 108 can generate the brine (electrolyte) otherwise not generated by the RO unit 102.

The salt adder 108 is preferably any device capable of providing a salt to the galvanic battery 110. In one embodiment, the salt adder 108 is a generally cylindrical device having an entrance port (for receiving the reject from the RO unit 102), an exit port (for directing salinated water to the battery 110), and a cavity in which a salt is deposited and through which water circulates to become salinated. In one approach, the entrance port may be situated relatively lower than the exit port, or even laterally offset therefrom (to spur cyclonic fluidic movement), to increase the residence time of water circulating through the adder 108 and thereby increase the water's salinity. Further, the salt adder 108 may include various means for increasing the water's rate of salination, such as a mechanical perturbator, a heater, and so on.

The salt adder 108 may be a refillable container or be provided pre-loaded for one time use. Further, the amount of salt required is dependent on the system's 100 parameters. In the MagC battery 110 example, MagC uses approximately 2% salinity in operation. With this information, coupled with flow rate, the adder 108 dimensions, and the system 100 run duration, etc., the amount of salt required by the system 100 can readily be determined and loaded into the adder 108 or be indicated as requiring loading of the determined amount.

The salt adder 108 may be configured to actuate as necessary. For example, the system 100 may include a salinity sensor that causes RO unit 102 reject to pass through the adder 108 if the sensor determines the reject requires additional salinity. The system 100 may also include a bypass valve that permits the reject to bypass the adder 108 if sufficient salt is already present. Additionally, the adder 108 bypass may be user-actuable if the user were to determine, for various reasons, that additional salt is not required.

Further, the salt adder 108 also provides a mechanism for starting the system 100 for first use. As previously mentioned, the loop between the RO unit 102 and the battery 110 may require an initial source of energy to start the system. Such energy may be provided by the storage device 116 being pre-charged. In an alternate approach, a user could inject water directly into the salt adder 108, bypassing the RO unit 102, which would then force salinated water (i.e., electrolyte) into the battery 110, and thereby enable the battery 110 to generate energy for powering the RO unit 102.

It must be appreciated that the above described embodiments are in no way limiting the scope of the present invention. Various combinations of the embodiments may be adopted to perform the energy generation function. Additional elements can be added to the system 100 and/or battery 110 to increase its energy-generation potential. For example, one or more solar panels or other renewable energy-related source may be coupled to the system 100 and/or battery 110 to generate additional energy.

Figure 6:
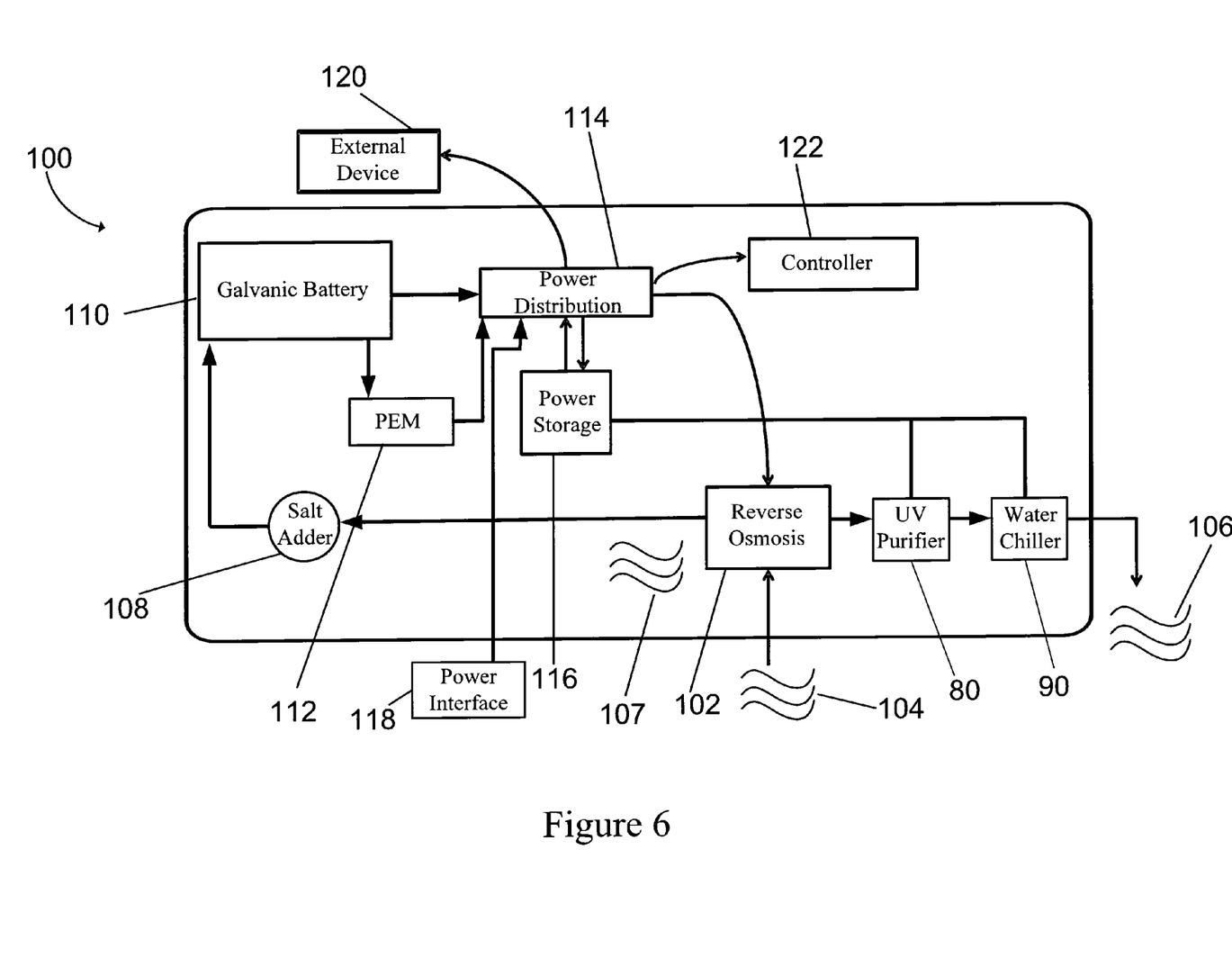
FIG. 6 is a schematic representation of a water purification system according to another embodiment of the disclosure incorporating a UV purifier and a water chiller.

Accordingly, as shown in FIG. 6, the water purifying system 100 may also include an ultra-violet (UV) purifier 80 and a water chiller 90. The UV purifier is configured to provide further purification of water, for example bacterial/microbial purification by utilizing ultraviolet light. A miniature chiller 90 may also be used to keep the clean water generated by the RO unit 102 and further purified by the UV purifier 90 in a cold state.

As is clear from the foregoing discussion of the example water purification system 100, the system 100 offers significant benefits over conventional water purification and/or energy generation technology. For example, generators are commonly available technology for generating energy in a remote environments. However, generators have several disadvantages. For example, they require fossil fuel to operate. In a military application, this requires the user(s) to transport sufficient amounts of fuel to operate the generator to a remote location, significantly increasing the weight/logistics burden on the unit. Additionally, fuel is expensive, non-renewable and otherwise problematic. In contrast, the system 100 is adapted to leverage a galvanic reaction as an energy source (instead of a fossil fuel), and rely on a potentially vast electrolyte to drive the reaction. This provides significant weight, cost and logistics demand improvements.

In another benefit, generators are loud and emit a readily detectable thermal signature. In the previously discussed military applications, such acoustic and/or thermal signatures can betray the team's location and compromise its security. In contrast, the battery 110 of the present embodiment of the invention operates with very little, if any, acoustic and/or thermal signature and can meet the team's energy and potable water needs without introducing unnecessary operational risks.

In yet another benefit, the exportable power capability of the present embodiment of the invention can meet localized power needs without the disadvantages of generators or similar devices. Returning to the military scenario, a current military challenge is "lightening the load," recognizing the fact that the typical soldier carries well over 100 pounds of gear with him/her on a given exercise. A significant portion of most soldiers' weight is represented by batteries. Given the challenges of accessing electricity in remote environments, most carried batteries are non-rechargeable and discarded once exhausted. The battery 110 provides a way to significantly decrease the amount of batteries a given soldier carries. Because of its energy exporting capability, the soldier can now carry the exact number of batteries required to operate his/her equipment and recharge the batteries as required, rather than carrying enough replacement batteries to complete a mission. This will reduce the amount of weight each soldier needs to carry (by as much as 15 pounds), increasing their effectiveness and decreasing fatigue and injury.

Figure 7:
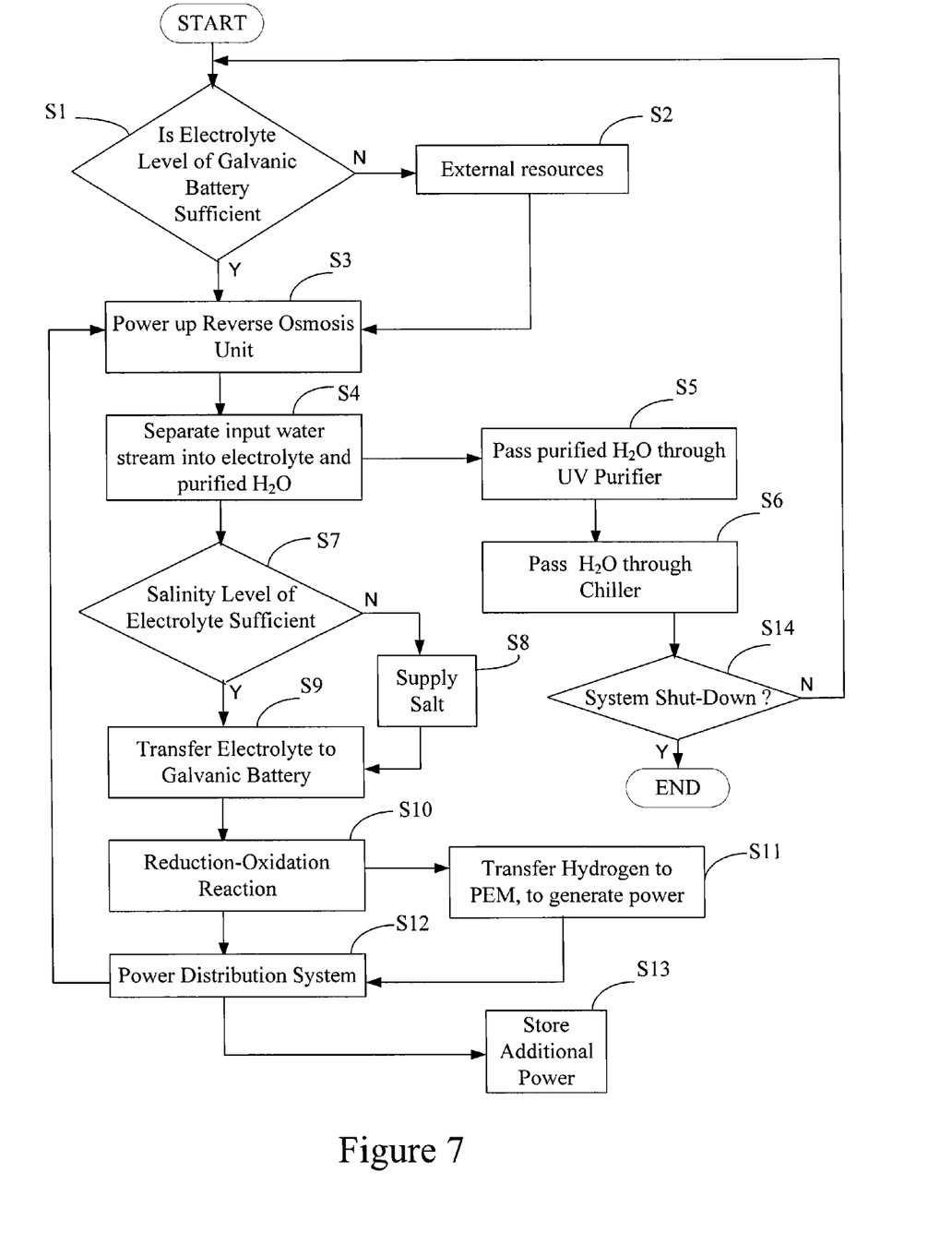
FIG. 7 is a flowchart depicting the steps performed by the water purification system that incorporates a self sustained energy generating system.

FIG. 7 depicts a flowchart depicting the steps performed by the water purification system. In step S1, the controller queries to check if the galvanic battery is sufficiently immersed within the electrolyte to generate the required power that is to be supplied to the reverse osmosis unit. If the response to the query is affirmative, the process proceeds to step S3, where the reverse osmosis unit is supplied power by the power distribution system.

However, if the response to the query in step S1 is negative, the process proceeds to step S2, where external resources are utilized to power up the system. As stated previously, the power up process can be accomplished in multiple ways. One approach is to add brine solution (electrolytes) through the salt adding mechanism 108, in order to supply the required amount of electrolytes to the galvanic battery. Alternatively, stored power in the power storage unit 116 can be used to supply initial power required to activate the RO unit. Further, if external power sources are available (for example generators), the external power source could be connected to the system via the power interface 118 to supply the required power to the system.

Upon receiving the required power to function, the reverse osmosis unit 102, segregates the input water stream into electrolytic solution (waste materials) and purified water in step S4. The electrolyte solution is transferred from the RO unit to the salt adding mechanism, where the salinity level of the electrolyte is checked by the salinity monitor (step S7). As stated previously, certain galvanic batteries may require a minimum level of salinity in the electrolytes to generate energy. For example the MagC battery uses approximately 1-2% of salinity level in the electrolyte to generate energy. If the salinity level of the electrolyte is within a predetermined limit, the process proceeds to step S9 where upon the electrolyte is transferred from the salt adding mechanism to the galvanic battery. If the level of salinity is not sufficient, the salinity level of the electrolyte is increased by adding salt or other compounds via the salt adding mechanism (step s8).

In step S10, upon receiving the electrolytes, the galvanic battery initiates the reduction-oxidation (redox) reaction, which generates electrical energy which is transferred to the power distribution unit (step S12). If MagC batteries are used as the anode and cathode of the galvanic battery, hydrogen is a byproduct of the redox reaction. In step S11, the hydrogen gas emitted by the battery is transferred to a hydrogen fuel cell which is used to generate more energy. The total energy generated by the system is transferred to a power distribution unit in step S12, where a part of the energy is transferred to the reverse osmosis unit for processing and excess energy is stored in the power storage unit as shown in step S13.

The purified water stream generated at step S4 is passed through a UV purifier for further purification in step S5 and through a water chilling unit in step S6 to maintain the pure water at a certain desired temperature, such that the water is ready for consumption/use. Lastly, in step S14, a query is made (by the controller) to check if the system is to be powered off. If the response to the query is affirmative, the water purification system ends. Otherwise, the flow proceeds to step S1 to repeat the above described mechanism of water purification.

Figure 8:
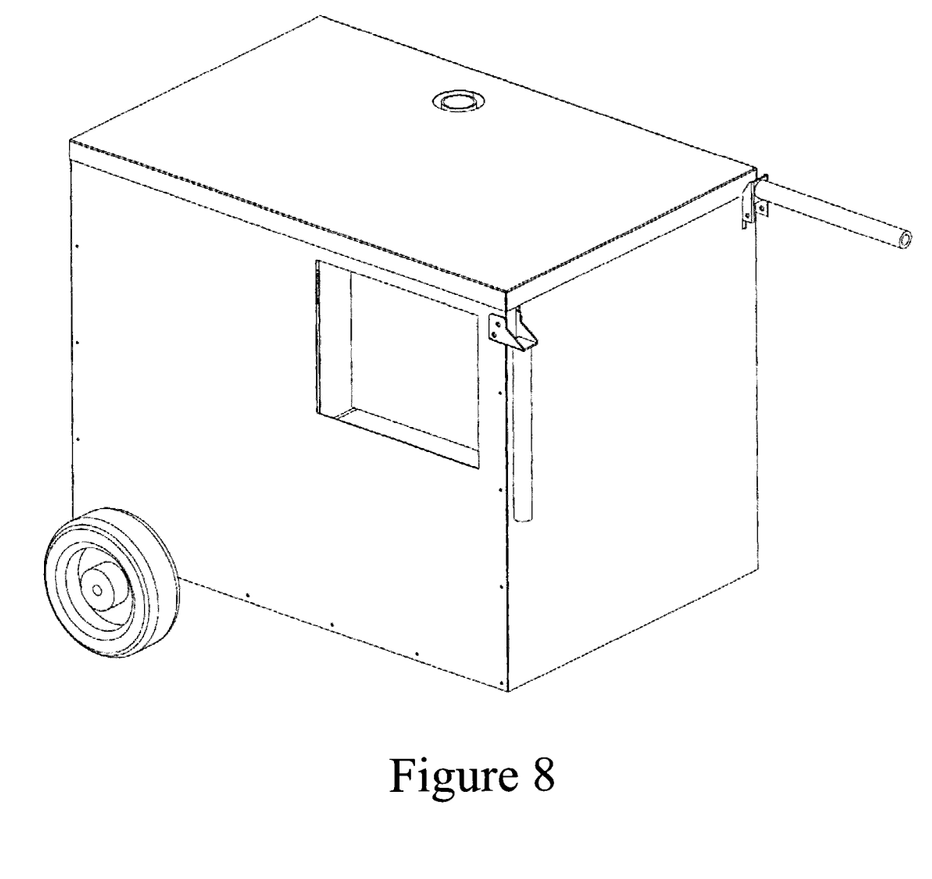
FIG. 8 depicts a configuration of an enclosure that houses the water purification system.

FIG. 8 shows an embodiment of the enclosure (casing) which houses the water purification system 100. One design for the housing the system is a wheelbarrow (cart) configuration thereby easing the portability of the system. Remaining cognizant of the weight of the system and its applications in remote locations, the frame of the casing as well as the mounting plates that house the RO unit, the galvanic battery, the controller, PEM hydrogen fuel cell and other components of the system, may be made of aluminum or other suitable materials. The weight/mass of the unit is distributed evenly so that the center of gravity allows a user to easily move the system on wheels and a pair of handles, in a wheelbarrow type fashion. Other configurations could easily be used to realize the water purification system. For example, a case mounted (trailer) configuration could be used wherein briefcase type militarized cases can be used to house the individual components of the system, thereby providing a smaller scale light weight man portable system.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of converting a waste stream to energy for purifying water, the method comprising:
   segregating, by a reverse osmosis device, the waste stream and purified water;
   detecting by a salinity sensor, the saline level of the waste stream;
   adding salt to the waste stream to bring the salinity level of the waste stream to a predetermined level;
   performing an oxidation reduction reaction between the waste stream and a metal to generate a first electric energy;
   transferring hydrogen generated as a byproduct of the oxidation reduction reaction to a hydrogen fuel cell, to generate a second electric energy; and
   distributing at least a fraction of a total generated electric energy to the reverse osmosis device.

* * * * *